United States Patent [19]

Cravens

[11] 4,038,238

[45] July 26, 1977

[54] LOW DENSITY RAPID-SETTING POLYURETHANES

[75] Inventor: Thomas E. Cravens, Lake Jackson, Tex.

[73] Assignee: The Dow Chemical Company, Midland, Mich.

[21] Appl. No.: 392,592

[22] Filed: Aug. 29, 1973

[51] Int. Cl.$^2$ .............................................. C08K 7/28
[52] U.S. Cl. ..................... 260/33.6 UB; 260/33.8 UB; 260/37 N; 260/859 R
[58] Field of Search ................. 260/33.6 UB, 33.8 UB, 260/37 N, 859 R, 859 PV, 2.5 BE, 2.5 AK, 830 P

[56] References Cited

U.S. PATENT DOCUMENTS

| | | | |
|---|---|---|---|
| 3,061,497 | 10/1962 | Wilson | 260/37 N |
| 3,251,916 | 5/1966 | Newnham | 260/2.5 BE |
| 3,358,052 | 12/1967 | Archer | 260/859 R |
| 3,378,511 | 4/1968 | Newton | 260/77.5 AP |
| 3,401,137 | 9/1968 | Finelli | 260/33.6 UR |
| 3,450,653 | 6/1969 | McClellan | 260/18 TN |
| 3,489,723 | 1/1970 | Kraft | 260/37 N |
| 3,524,794 | 8/1970 | Jonnes | 260/2.5 AK |
| 3,549,472 | 12/1970 | King | 260/2.5 AK |
| 3,714,110 | 1/1973 | Verdol | 260/33.6 UB |
| 3,726,827 | 4/1973 | Jones | 260/31.8 N |
| 3,746,692 | 7/1973 | Olstowski | 260/2.5 AP |
| 3,755,241 | 8/1973 | Brady | 260/37 N |

OTHER PUBLICATIONS

Einhorn, "Extended Foams," Journal of Cellular Plastics, Jan. 1965, pp. 25–31.

*Primary Examiner*—Paul R. Michl
*Attorney, Agent, or Firm*—James G. Carter

[57] ABSTRACT

Low density polyurethanes having the ability to reproduce mold detail in excellent quality from rapid-setting polyurethane-forming compositions are obtained by mixing a rapid-setting polyurethane-forming composition with light weight hollow spheres or microballoons and a liquid viscosity reducing agent such as xylene.

2 Claims, No Drawings

LOW DENSITY RAPID-SETTING POLYURETHANES

This invention pertains to rapid-setting polyurethane compositions and more particularly to light weight rapid-setting polyurethane compositions.

Rapid-setting polyurethane compositions are known in the art as is taught, for example, in U.S. Pat Nos. 3,378,511, 3,725,355; 3,726,827 and in co-pending applications Ser. No. 191,343, filed Oct. 21, 1971; Ser. No. 205,697, filed Dec. 7, 1971; Ser. No. 327,630, filed Jan. 29, 1973; and Ser. No. 327,718, filed Jan. 29, 1973.

Attempts to lower the densities of these rapid-forming polyurethane products by the addition thereto of light weight filler materials such as hollow spheres or microballoons of glass or synthetic resins have resulted in mold detail pick-up of poor quality.

A method has now been discovered for preparing polyurethane compositions having bulk densities of less than about 0.7 grams per cc from rapid-forming polyurethane compositions which possess the ability to reproduce mold detail in excellent quality.

In addition to the excellent mold detail, the products of the present invention show less shrinkage in the mold than do the unfilled polyurethanes prepared from rapid-setting polyurethane-forming compositions.

The present invention is therefore directed to solid, polyurethane articles having a bulk density of less than about 0.7 g/cm$^3$ and which are substantially free of large voids and surface imperfections resulting from the admixture of a composition comprising A. a rapid-setting polyurethane-forming composition which produces a polyurethane which can be demolded without the application of an external source of heat within 5 minutes after admixture of the components of the polyurethane-forming composition, B. as a light weight filler component, hollow spheres or particles of a glass or a synthetic resinous material in an amount to provide the polyurethane composition with a bulk density of less than about 0.7 grams per centimeter, C. as a viscosity reducing component, a liquid aromatic or halogenated aromatic compound in a quantity sufficient to provide the mixture of components (A), (B) and (C) with a viscosity of less than about 2,000 centipoises at 25° C.

Rapid-setting polyurethane-forming compositions suitable for use herein are fully described in the aforementioned U.S. patents and pending applications which are incorporated herein by reference.

Suitable aromatic hydrocarbons useful as viscosity reducing agents herein include, for example, 1-4 carbon atoms aliphatic hydrocarbon substituted benzenes, such as xylene, toluene, ethyl benzene, cumene, mixtures thereof and the like.

Suitable halogenated aromatic hydrocarbons useful as viscosity reducing agents herein include for example, halogen substituted benzenes such as chlorobenzene, chlorotoluene, trichlorobenzene, bromobenzene, bromotoluene, mixtures thereof and the like.

Quantities of the viscosity reducing agents are dependent on their own viscosities and on the viscosity of the mixture of components without such agent, but is usually in the range of from about 2% to about 20% and preferably from about 10 to about 15 percent by weight of the total compositions.

Suitable light weight hollow fillers include hollow spheres or microballoons of any composition which are not dissolved by the components of the polyurethane composition, such as, glass or synthetic resins such as, for example, phenolic resins, epoxy resins, polymers of ethylenically unsaturated monomers including methyl methacrylate, vinylidene chloride, acrylonitrile, mixtures thereof and the like. These fillers usually have true densities of from about 0.03 to about 0.45 grams/cc and particle sizes in the range of from about 10 to about 100 microns.

The quantity of such light weight hollow spheres or microballoons is such as will reduce the bulk density of the composition from at least 1 to less than about 0.7 grams per cubic centimeter and is usually in the range of from about 30% to about 70% and preferably from about 40% to about 60% by volume of the total composition.

The polyurethanes of this invention are usually prepared by admixing all of the ingredients in any order of addition except that the catalyst, when employed, is usually the last to be mixed and in those formulations wherein a catalyst is not required, then the polyisocyanate is usually the last to be added.

Like most polyurethane compositions, other additives such as fire retardant agents, mold release agents and the like can be added to the formulations to achieve the desired effect.

The following examples are illustrative of the present invention:

EXAMPLE 1

Four formulations were prepared and poured into a silicone rubber mold having an intricate surface design so as to determine the quality of surface detail picked up by the polyurethane formulation.

In each instance, all of the components of the composition except the catalyst was blended together and when the mixture was substantially homogeneous, the catalyst was added and after additional blending for about 10 seconds, the resultant mixture was poured into the mold.

The components of the formulations and results are given in the following Table I. Formulation 1 is an example of the present invention while Formulations 2-4 are comparative experiments.

TABLE I

| COMPONENTS AND RESULTS | FORMULATION | | | |
|---|---|---|---|---|
| | 1 | 2 | 3 | 4 |
| Polyol[1], grams | 30 | 30 | 30 | 30 |
| Polyisocyanate[2], grams | 48 | 48 | 48 | 48 |
| Dioctyl phthalate, grams | 30 | 30 | 0 | 30 |
| Xylene, grams | 20 | 0 | 30 | 20 |
| Microspheres[3], grams | 2.56 | 2.16 | 2.16 | 0 |
| Stannous octoate, grams | 0.9 | 0.8 | 0.8 | 0.8 |
| Viscosity, centipoises at 25° C | 960 | 3840 | 580 | 50 |
| Solidification, Time[5], seconds | 20 | 20 | 30 | 30 |
| Demold time,[5] seconds | 60 | 60 | 60 | 60 |
| Density, g/cm$^3$ | 0.63 | 0.51[4] | not | 1.22 |

TABLE I-continued

| COMPONENTS AND RESULTS | FORMULATION | | | |
|---|---|---|---|---|
| | 1 | 2 | 3 | 4 |
| Surface | Excellent detail and appearance with no bubbles | Bubbles on surface, poor mold detail | determined Foamed out of mold | Excellent detail and appearance with no bubbles |

[1] The polyol employed was the adduct of glycerine with propylene oxide to a molecular weight of about 260.
[2] The polyisocyanate was a polymethylene polyphenylisocyanate having an NCO equivalent weight of about 135.
[3] The expanded microspheres had a polymer shell formed of a copolymer consisting of about 74 wt. % vinylidene chloride, 25.4 wt. % of acrylonitrile and 0.6 wt. % of divinyl benzene and as a singleinclusion inside the polymer shell, a droplet of isobutane which is about 6 wt. % of the total weight of the microsphere, said microspheres having a true density of about 0.03 g/cc.
[4] The low density was due to large air voids which appeared throughout the resultant cast object.
[5] Solidification and demold times were measured from the instant the catalyst was blended into the mixture.

EXAMPLE 2

Two formulations were prepared as in Example 1 employing the same polyol, polyisocyanate and light weight filler material. The formulations and results are given in the following Table II.

TABLE II

| COMPONENT AND RESULTS | A Present Invention | B Comparative Experiment |
|---|---|---|
| Polyol, grams | 60 | 60 |
| Polyisocyanate, grams | 96 | 96 |
| Dioctyl phthalate, grams | 60 | 60 |
| Xylene, grams | 40 | 40 |
| Microspheres, grams | 5.12 | 0 |
| Stannous octoate, grams | 1.8 | 1.6 |
| Viscosity, centipoises at 25° C | 960 | 50 |
| Solidification time, seconds | <30 | <30 |
| Demold time, seconds | 60 | 60 |
| Density, g/cm$^3$ | 0.62 | 1.11 |
| Linear shrinkage, % | 1.25 | 1.87 |

I claim:

1. A solid, polyurethane article having a bulk density of less than about 0.7 g/cm$^3$ and which is substantially free of large internal air voids and surface imperfections resulting from the admixture of a composition comprising A. a rapid-setting polyurethane-forming composition which produces a polyurethane which can be demolded, without the application of an external source of heat, within 5 minutes after admixture of the components of the polyurethane-forming composition, B. as a light weight filler component, hollow spheres or microballoons of a copolymer of vinylidene chloride, acrylonitrile and divinyl benzene in an amount to provide the polyurethane composition with a bulk density of less than about 0.7 g/cm$^3$, said spheres or microballoons having a density of from about 0.03 to about 0.45 grams/cc and a particle size of from about 10 to about 100 microns, and C. as a viscosity reducing component, a liquid aromatic or halogenated aromatic compound in a quantity sufficient to provide the mixture of Components (A), (B) and (C) with a viscosity of less than about 2000 centipoises at 25° C.

2. The composition of claim 1 wherein the liquid aromatic compound is a halogen substituted benzene.

* * * * *